United States Patent [19]
Pittman

[11] Patent Number: 5,174,550
[45] Date of Patent: Dec. 29, 1992

[54] MOUNTING FOR A SCREW JACK

[76] Inventor: Jerry W. Pittman, P.O. Box 610149, Dallas, Tex. 75261

[21] Appl. No.: 781,714

[22] Filed: Oct. 22, 1991

[51] Int. Cl.$^5$ ............................................. B66F 3/10
[52] U.S. Cl. .................................... 254/420; 254/424
[58] Field of Search ................ 254/424, 425, 420, 45, 254/98

[56] References Cited

U.S. PATENT DOCUMENTS

| | | | |
|---|---|---|---|
| 2,539,897 | 1/1951 | Davey et al. | 254/424 |
| 2,970,810 | 2/1961 | Zich et al. | 254/420 |
| 3,851,855 | 12/1974 | Douglass | 254/420 |
| 4,316,601 | 2/1982 | Osborne et al. | 254/424 |
| 4,784,369 | 11/1988 | Bock | 254/45 |

*Primary Examiner*—Robert C. Watson
*Attorney, Agent, or Firm*—Crutsinger & Booth

[57] ABSTRACT

A screw jack incorporating a quick retract mechanism to permit movement of the jack into engagement with the ground such that only limited rotation of the screw is necessary for elevating the tongue of a trailer for disengaging a coupler on the trailer from a trailer hitch. The screw-type jack incorporates an improved handle which is rotatable about a horizontal axis between an active position for rotating the screw about a vehicle axis and a stowed position wherein the handle engages the body of the jack to prevent rotation of the screw. A support for the screw jack which incorporates improved versatility such that it can be interchangeably used on other jacks and can be used in applications involving uneven and/or non-level surface conditions.

18 Claims, 7 Drawing Sheets

MOUNTING FOR A SCREW JACK

TECHNICAL FIELD

The screw jack disclosed herein relates to improvements in a jack detachably secured to the tongue of a trailer.

BACKGROUND OF INVENTION

Screw-type jacks heretofore employed for supporting a trailer tongue, when the trailer is disconnected from the hitch of a towing vehicle, have been provided with a mounting flange or support plate welded to the body of the jack. The mounting flange is generally bolted to the tongue of the trailer and a support leg having a foot or caster on the lower end is moved vertically by rotating a screw in the jack.

When trailers are manufactured and then shipped to dealers for resale, jacks generally are not installed on the trailers to facilitate stacking the trailers for shipment. Dealers sometimes fail to install the jack properly after the trailers have been delivered.

Screw-type jacks developed heretofore have not been constructed to permit movement of the jack quickly to an initial position wherein the foot or caster engages the ground and to permit subsequent rotation of the screw only for elevating the tongue of the trailer the distance required for disengaging the coupler on the trailer tongue from the hitch on the towing vehicle.

Further, a thrust washer is generally butt welded to the upper end of the outer tube of screw jacks to prevent vertical movement of the screw through the outer tube. The butt weld securing the thrust washer to the upper end of the outer tube of the jack generally is capable of carrying only about 12,000 to 16,000 pounds of force, which is inadequate for certain applications. Handles on screw jacks heretofore devised required a separate locking mechanism to prevent rotation of the elevating screw when the jack was not in use.

In addition to the aforementioned limitations, the present caster and foot designs used on jacks are not very versatile; they are not interchangeable between different sized jacks nor can they be used to provide firm support on uneven or non-level surface conditions. A need exists for a screw-type jack and support which eliminate these deficiencies.

SUMMARY OF INVENTION

A screw-type jack disclosed herein incorporates a novel crank handle construction which is movable to a first position for rotating an acme screw in a jack and movable to an inactive or stowed position wherein the handle frictionally engages the body of the jack to prevent rotation of the acme screw.

The tube forming the jack ram is formed to permit the use of an internally threaded nut in jacks of different sizes to reduce the number of parts required for use in a variety of jack designs.

The upper end of the outer tubular member of the screw jack is crimped to form an inwardly extending shoulder to which a thrust washer is welded. This significantly increases the capacity of the jack from about 12,000 to 16,000 pounds to approximately 20,000 pounds.

Spaced detents are formed in the outer tube of the jack to form a quick retract mechanism while also providing a guide which replaces keys heretofore employed for preventing rotation of the outer tube relative to the inner tube.

The mounting member which supports the jack is configured to be connected to the tongue of a trailer at the factory. When the trailer is delivered the jack can be quickly and easily moved through the mounting bracket and latched into position.

A foot for the jack disclosed herein, and for use with most other jacks, incorporates a single plate construction (for ease of manufacture) with ears cut into the plate forming a bracket. The foot is pivotally connected to the ram of a jack by a pin which passes through slotted openings centrally located in each ear of the bracket. The openings are slotted to accommodate rotation of the foot about the longitudinal axis of the pin.

The ram of the jack rests on a seat formed by a saddle shaped protrusion in the plate located between the two ears. A rim extends around the entire periphery of the plate, formed by the plate's edges.

BRIEF DESCRIPTION OF THE DRAWING

Drawings of a preferred embodiment of the invention are annexed hereto so that the invention may be better and more fully understood, in which.

Numeral references are employed to designate like parts throughout the various figures of the drawing.

DESCRIPTION OF A PREFERRED EMBODIMENT

Figure 1:
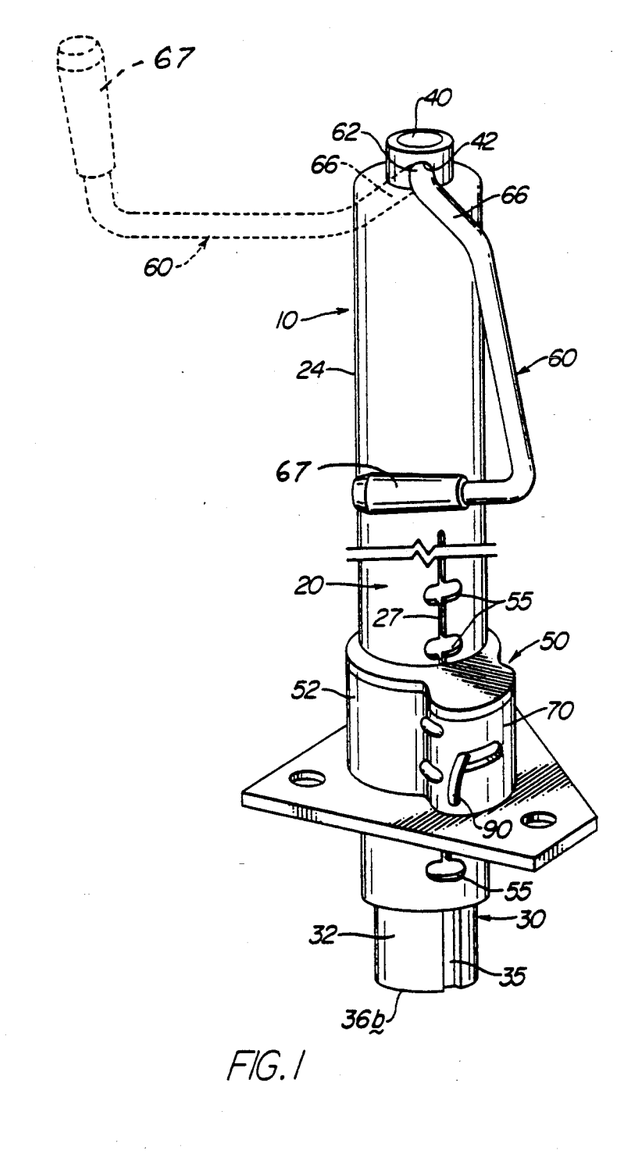
FIG. 1 is a perspective view of a top wind screw jack.
Figure 2:
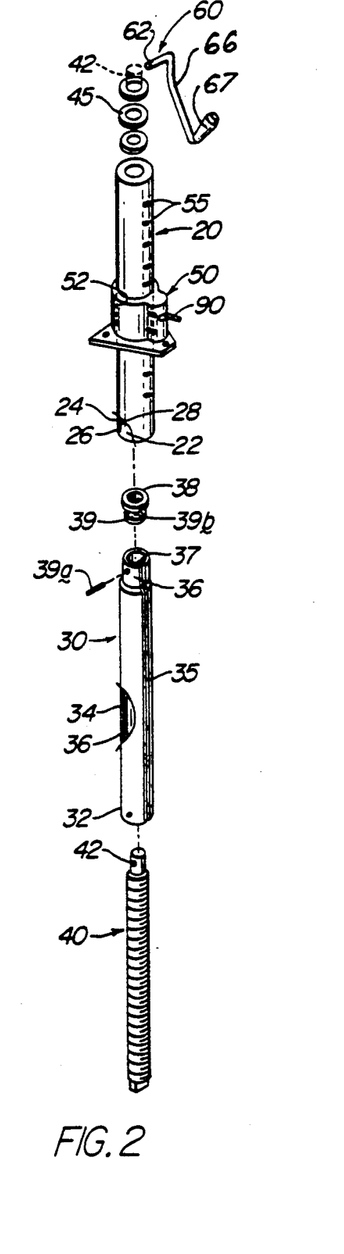
FIG. 2 is an exploded perspective view of parts forming the improved screw jack and mounting mechanism.

Referring to FIGS. 1 and 2 of the drawing, the numeral 10 generally designates a top wind screw jack adapted to be mounted on the tongue of a trailer. However, it should be appreciated that while the illustrated embodiment is adapted for mounting on the tongue of a trailer, similar structure may be mounted on other structures, for example, on a recreation vehicle or mobile home adjacent the corners thereof to function as leveling screws.

The screw jack 10 comprises a hollow tubular jack body 20 having a central bore 22 in which a ram assembly 30 is telescopically received. A threaded elevating screw, generally designated by the numeral 40, is threadedly connected between jack body 20 and ram assembly 30 for moving ram assembly 30 longitudinally of the bore 22 extending through jack body 20. A mounting member, generally designated by the numeral 50, is provided for mounting the tubular jack body 20 and ram assembly 30 on the trailer tongue (not shown) or other suitable structure.

Jack body 20 preferably comprises a hollow tubular member 24 having an outer wall 26 having a longitudinally extending groove 27 formed therein and a cylindrical inner wall 28 which extends around the periphery of bore 22. The tubular member 24 is crimped on one end to form an inwardly extending shoulder 25 and a thrust washer 29 is tack welded to the shoulder 25 at two locations 29a and 29b spaced approximately 180° apart. It should be readily apparent that the weld may extend around the entire 360° of the circumference of the shoulder 25, if it is deemed expedient to do so. However, the spaced tack welds hold the thrust washer in position and extending the weld around the entire circumference of the shoulder 25 does not appreciably increase the load carrying capability of the jack.

Crimping the end of tubular member 24 to form shoulder 25 increases the load carrying capability of the jack to over 20,000 pounds, using the same materials heretofore employed to make a 16,000 pound capacity jack when the thrust washer was welded to the end of the tubular member without the shoulder formed by crimping the end of the tubular member 24.

The edge 25a of the inwardly extending shoulder 25 forms a lip extending around the periphery of a cavity 25b having a bottom wall formed by the thrust washer 29. As will be hereinafter more fully explained, a seal ring 21 having an outer surface 21a urged into sealing relation with the lip on shoulder 25 substantially fills the cavity 25b. The seal ring 21 has a central aperture 21b which seals against the upper end of the elevating screw 40.

A cylindrical dust cover 23, preferably formed of a non-corrosive, self lubricating material, such as tetrafloroethylene (Teflon, a registered trademark of E. I. DuPont de Nemours and Co. of Wilmington, Del.), covers the seal 21 and the upper end of the shoulder 25 to provide and environmentally protected waterproof closure.

The annular shoulder 25 on the upper end of the inner wall 28 of the tube 24 and thrust washer 29 support a thrust bearing 45 in bore 22 in tube 24. Bearing 45 is a conventional thrust bearing having balls 45a or needles (not shown) and upper and lower races 45b and 45c. Bearing 45 is supported by a thrust washer 46 on a shoulder 48 on screw 40.

As will be hereinafter more fully explained, the outer wall 26 of tubular member 24 is deformed inwardly forming detents 55 equally spaced along a significant portion of the length of the outer wall 26 of tubular member 24.

Figure 3A:
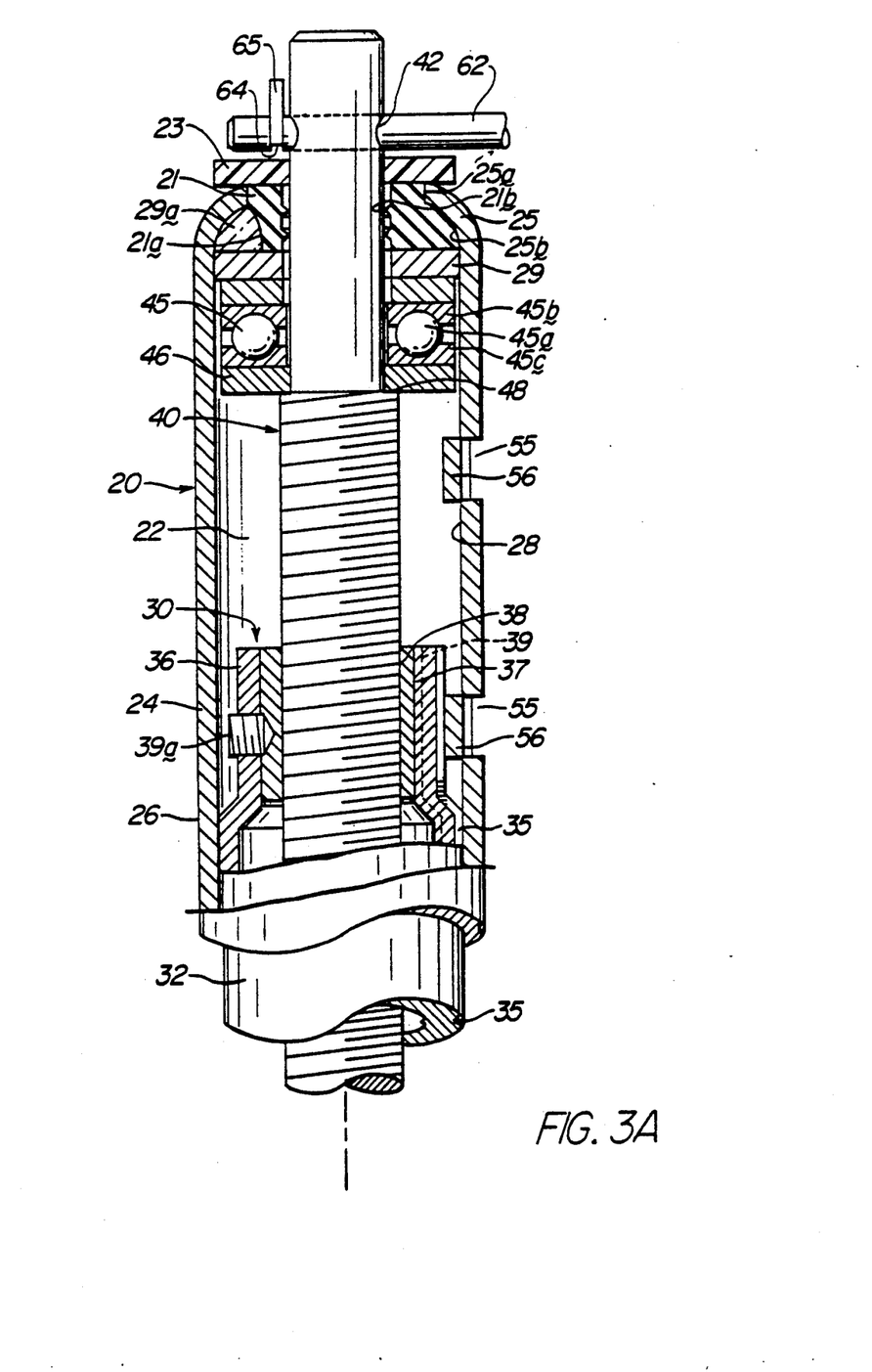
FIGS. 3A and 3B are partially sectionalized elevational views of the jack, parts being broken away to more clearly illustrate details of construction.
Figure 3B:
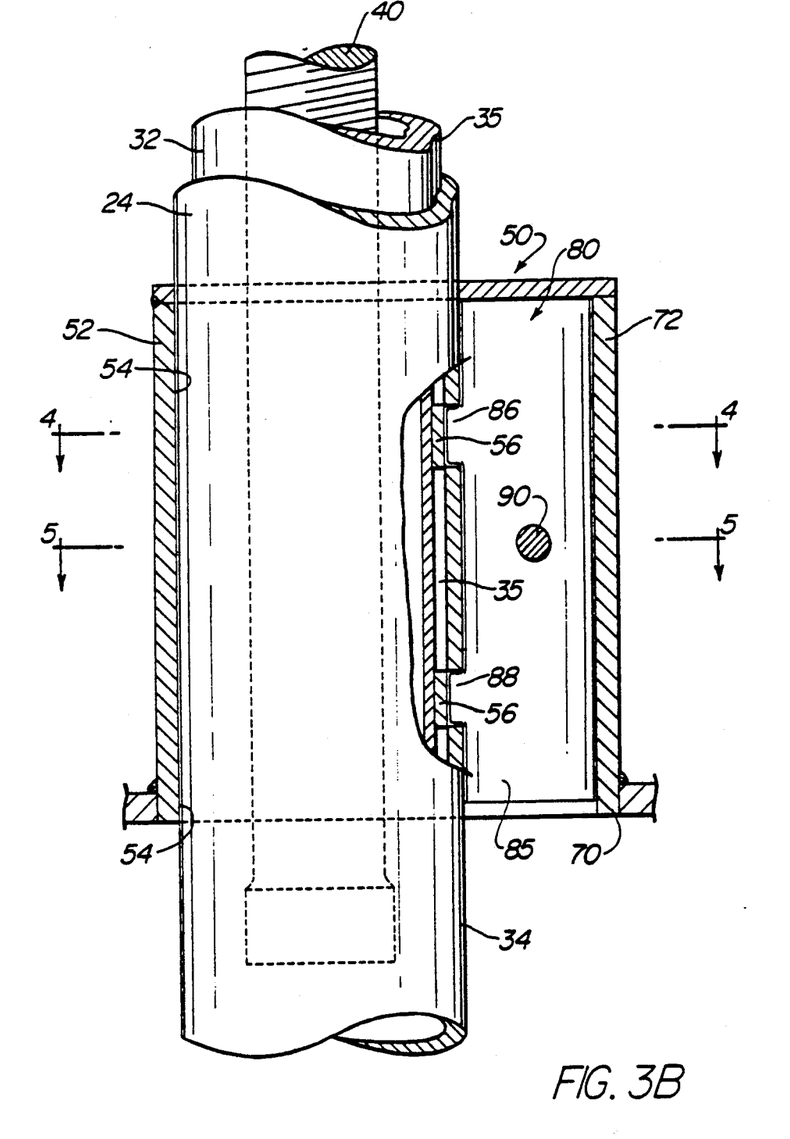

As best illustrated in FIG. 3, the deformation of the outer wall 26 of jack body 20 forms spaced projections 56 which extend inwardly from the inner wall 28 into bore 22 of the tubular member 24.

As best illustrated in FIG. 3 of the drawing, the ram assembly 30 is preferably formed by a tubular member 32 having an outer wall 34 in which a longitudinally extending guide way 35 is formed. An internally threaded jack nut 38 is secured in the upper end of tubular member 32.

The wall of tubular member 32 is deformed to provide a reduced diameter end section 36 such that the diameter of the inner wall adjacent one end 36 of the inner tube 30 is less than the inside diameter of the inner wall of tube 32 adjacent the opposite end 36b thereof. The internally threaded jack nut 38 extends into the reduced diameter end section 36.

The internally threaded jack nut 38 has a groove 39 formed therein into which the longitudinally extending rib 37 on the tube 32 extends to prevent rotation of the internally threaded jack nut 38 relative to tube 32. A set screw 39a extends into a circumferentially extending groove 39b securing the internally threaded jack nut 38 in the passage in the tube 32 and preventing longitudinal movement of the internally threaded member relative to the inner tube 32.

Thus, the ram assembly 30 of the top wind screw jack 10 includes a hollow tubular member 32 having an outer wall 34 in which a longitudinally extending guide way 35 is formed and an internally threaded jack nut 38 secured such that rotation of the threaded elevating screw 40 imparts longitudinal movement to the tubular member 32 longitudinally of the tubular jack body 20.

The outer tube 24 of jack 10 has an outer wall 26 and an inner wall 28 configured such that the inner wall 28 extends around the periphery of a bore or cylindrical opening 22. Spaced projections 56 on the inner wall 28 of the outer tube 24 and spaced recesses 55 in the outer wall 26 of the outer tube 24, are positioned such that the projections 56 extending into the guide way 35 formed in the outer wall 34 of the inner tube 30 preventing rotation of the inner tube 30 relative to the outer tube 24.

A crank 60 having a shank 62 extends through an aperture 42 in the elevating screw 40 for rotating the elevating screw.

The shank 62 on the crank 60 has a groove 64 formed adjacent one end thereof to accommodate a snap ring 65 or star washer to prevent disengagement of shank 62 from aperture 42.

A lever arm 66 is secured to the shank 62, the lever arm 66 being configured to impart rotation to the elevating screw 40 when the shank 62 is in a first position illustrated in dashed outline in FIG. 1, and to position handle 67 to frictionally engage the outer wall 26 of the outer tube 24 when the shank 62 is rotated to move lever arm 66 to the second position illustrated in full outline in FIG. 1 to prevent rotation of the elevating screw 40.

Figure 4:
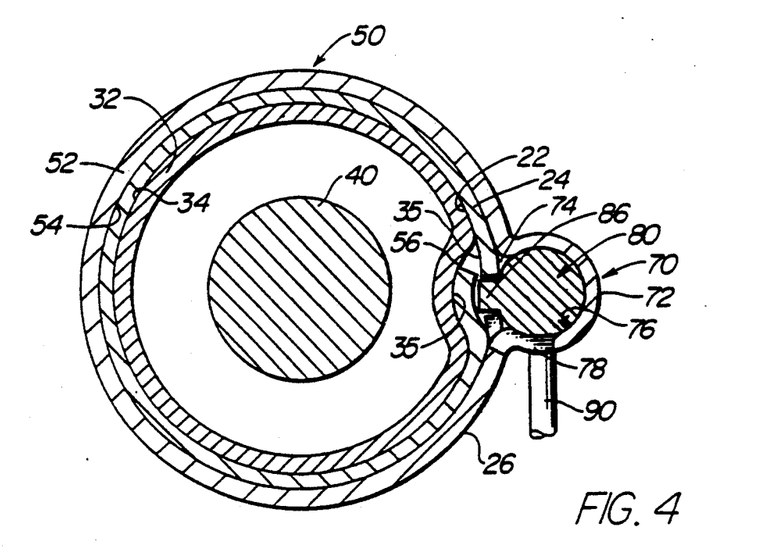
FIG. 4 is a cross-sectional view taken along line 4—4 of FIG. 3.

A preferred embodiment of jack 10 includes a quick retract mounting mechanism 50, best illustrated in FIGS. 1 and 3-4, formed by a sleeve having a cylindrical wall 52 having an inner surface 54 extending around a longitudinally extending passage 55. A lock receiving housing 70, closed at the upper end by a plate 71, is formed on the mounting mechanism 50 and has a cylindrical wall segment 72 secured to the wall 52 of the sleeve, the sleeve having a passage 74 formed in the wall thereof communicating with the chamber 76 in the housing 70. Locking apparatus 80 in the chamber 76 is positionable through the passage 74 formed in the wall 74 of the sleeve for movement into the spaced detents 55 in the outer tube 24. A flange 70a is formed on housing 50 for securing the jack to a trailer tongue.

The locking apparatus 80 preferably comprises a cylindrical member 85 which extends into groove 27 in tubular member 24; a pair of lugs 86 and 88 extending outwardly from the cylindrical member 85 and an actuating arm 90 secured to the cylindrical member 85 adapted to rotate the cylindrical member 85 for moving the lugs 86 and 88 into the spaced detents 55. When lugs 86 and 88 are rotated to the position illustrated in FIG. 5, tubular member 24 moves freely through passage 55. However, it is restrained against rotation by the portion of cylindrical member 85 which extends into groove 27.

Figure 5:
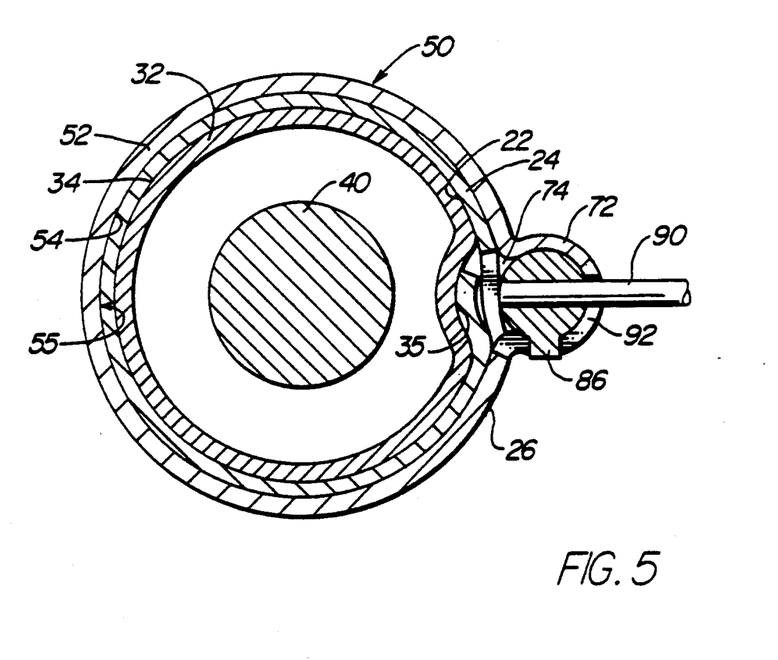
FIG. 5 is a cross-sectional view taken along line 5—5 of FIG. 3.
Figure 6:
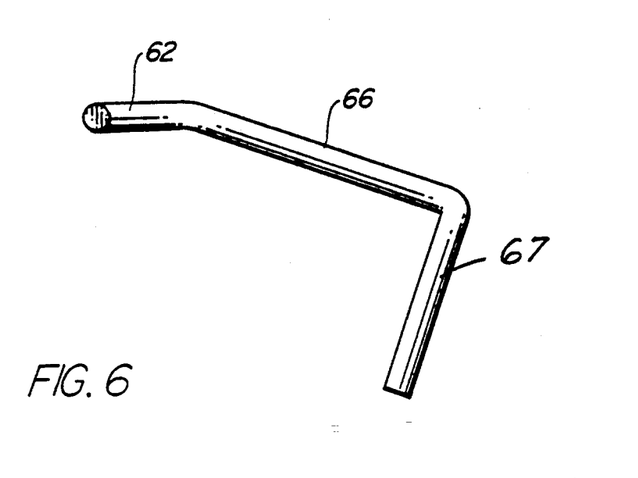
FIG. 6 is a front elevational view of the jack handle.
Figure 7:
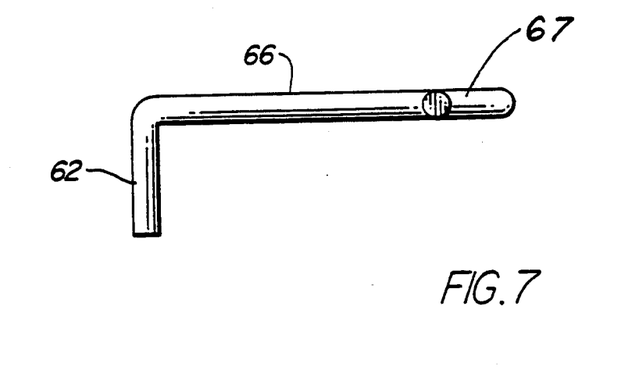
FIG. 7 is a side elevational view thereof.

A pair of grooves 78 and 79 are formed in the wall of cylinder 72 to permit rotation of lugs 86 and 88 from the position illustrated in FIG. 4 to the position of FIG. 5.

Actuating arm 90 is secured by a press fit in a hole in cylindrical member 85 and moves through a groove 92 formed in cylinder 72.

Since the detents 55 are equally spaced along a substantial portion of the length of the outer tube 24, the mounting sleeve 50 has a passage 54 longer than the spacing between adjacent detents 55 such that at least two lugs 86 and 88 on the locking apparatus 80 simultaneously engage the detents 55.

Locking apparatus 80 is movably secured to the tubular mounting sleeve 50 to selectively engage spaced recesses 55 in the outer wall 26 of the outer tube 24 to limit movement of the outer tube 24 through the passage in the mounting sleeve 50. Elevating means 40 secured between the outer tube 24 and the inner tube 30 for moving the inner tube 30 relative to the outer tube 24 is used to elevate the trailer tongue after the lower end of the jack is moved to engage the ground by manipulation of the quick retract mechanism 50.

Figure 8:
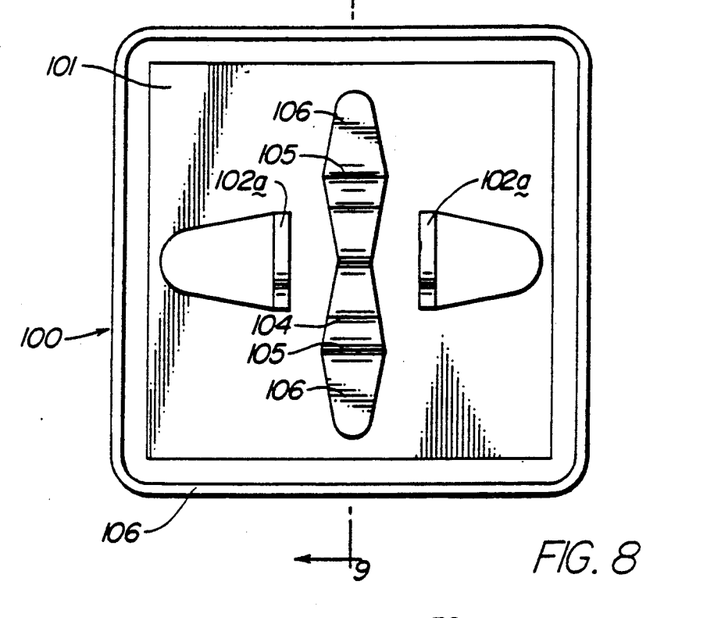
FIG. 8 is a plan view of the foot.
Figure 9:
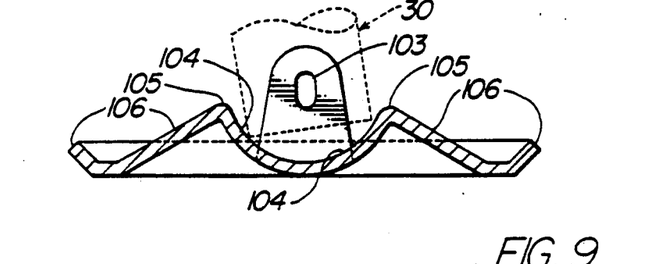
FIG. 9 is a cross-sectional view taken across line 9 in FIG. 8.
Figure 10:
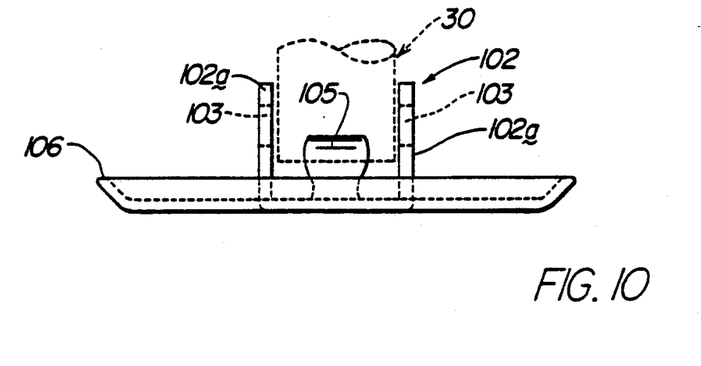
FIG. 10 is a side elevation view thereof.
Figure 11:
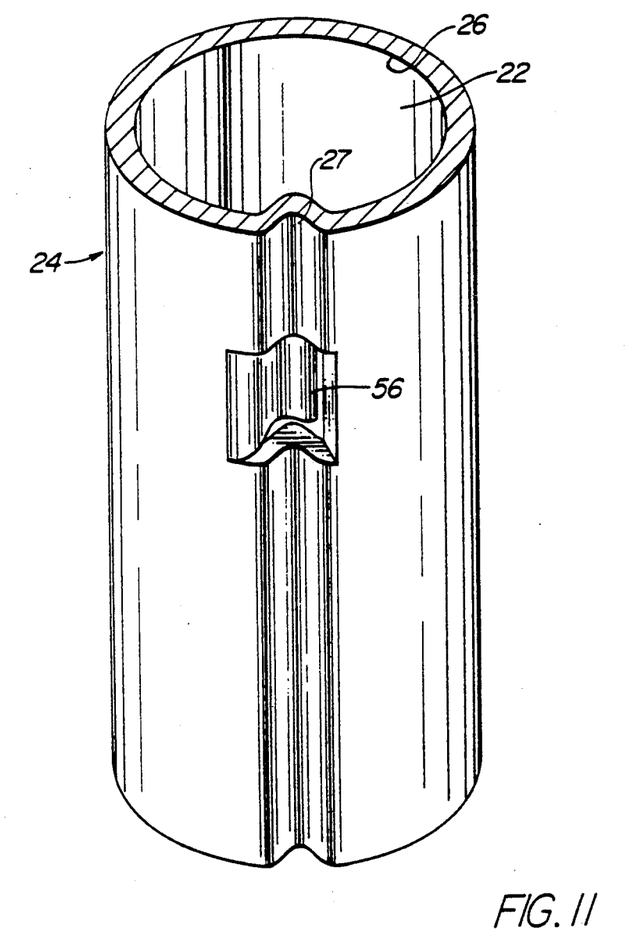
FIG. 11 is a fragmentary perspective view of a portion of the jack body.

As illustrated in FIGS. 8–10, a support mounted on the ram of the jack includes a detachable foot 100 comprising a plate 101 with a bracket 102 formed by upwardly bent ears 102a cut into the plate 101, a seat 104 formed by a depression in the plate 101 centrally located between the two ears 102a, and a rim 106 formed at the periphery of the plate by the edges of the plate.

Each ear 102a includes an elongated opening 103 through which a pin passes to pivotally connect the foot 100 to an opening 103a in the end of the ram 30 of the jack. The opening is centrally located in the circular portion of each ear 102a and slotted to allow rotation of the foot about the longitudinal axis of the pin when an uneven surface condition is encountered. The lower end of ram 30 is supported in the seat 104 so that the load on the pin extending through slot 103 into the opening 103a on ram 30 is minimized. The seat 104, formed by the saddle shaped protrusion in the plate, provides support for the ram of the jack and is designed to provide support through the full range of the foot's motion, while the jack maintains its vertical position.

In addition to the rotation about the vertical plane which bisects the two ears, the foot has the ability to rotate in the vertical plane that is perpendicular to that plane which bisects the two ears. To increase the foot's stability, a rim 106 is formed around the periphery of the plate which increases the stiffness of the foot 100 in both vertical planes. Although the degree of rotation perpendicular to the longitudinal axis of the pin is small and depends primarily on the size of the ram, the increased stiffness in that plane provides an added factor of safety.

Having described the invention, it is claimed:

1. A jack comprising: tubular mounting means having a longitudinally extending passage; an outer tube slidably disposed in said passage, said outer tube having an outer wall surface and an inner wall surface, said inner wall surface extending around the periphery of a cylindrical opening; an inner tube slidably disposed in said cylindrical opening, said inner tube having an outer wall surface in which a longitudinally extending guide way is formed and an inner wall surface having a longitudinally extending rib formed thereon; said outer tube being deformed to provide spaced projections on the inner wall surface of said outer tube and spaced recesses in the outer wall surfaces of said outer tube, said projections on said inner wall surface of said outer tube extending into said guide way formed in the outer wall surface of said inner tube preventing rotation of said inner tube relative to said outer tube; locking means movably secured to said tubular mounting means, said locking means being movable to selectively engage spaced recesses in the outer wall surface of said outer tube to limit movement of said outer tube through said passage in said mounting means; and elevating means secured between said outer tube and said inner tube for moving said inner tube relative to said outer tube.

2. A jack according to claim 1, with the addition of an annular shoulder on the upper end of the inner wall surface of said outer tube; bearing means in said passage in said outer tube; and means securing said bearing means to said shoulder to prevent movement of said bearing means longitudinally of said passage in said outer tube.

3. A jack according to claim 1, said means for moving said outer tube relative to said inner tube comprising: an externally threaded elevating screw; internally threaded jack nut means; and means securing said internally threaded jack nut means to said inner tube such that rotation of said screw imparts movement of said inner tube longitudinally of said outer tube.

4. A jack according to claim 3, said elevating screw having an aperture formed in the upper end thereof; and crank means having a shank extending through said aperture in said elevating screw for rotating said elevating screw.

5. A jack according to claim 3, said crank further comprising: a lever arm secured to said shank, said lever arm being configured to impart rotation to said elevating screw when said shank is in a first position and to frictionally engage the outer wall surface of said outer tube when said shank is in a second position to prevent rotation of said elevating screw.

6. A jack according to claim 3, said internally threaded jack nut means having a groove formed therein into which said longitudinally extending rib on said inner tube extends to prevent rotation of said internally threaded jack nut means relative to said inner tube; and means securing said internally threaded jack nut means in said passage in said inner tube and preventing longitudinal movement of said internally threaded jack nut means relative to said inner tube.

7. A jack according to claim 6, the wall of said inner tube being deformed to provide a reduced diameter end section in which the diameter of the inner wall of the inner tube adjacent one end of the inner tube is less than the inside diameter of the inner wall of the inner tube adjacent the opposite end thereof, said internally threaded jack nut means extending into said reduced diameter end section of said inner tube.

8. A jack according to claim 1, said tubular mounting means having a second passage formed therein, said locking means being movable in said second passage to engage said detents in said outer wall surface of said outer tube.

9. A jack according to claim 8, said second passage in said tubular mounting means being a circular passage extending generally parallel to said first passage; and means movably securing said locking means in said second passage such that said locking means is selectively movable into engagement with said spaced detents.

10. A jack according to claim 9, said tubular mounting means comprising: a mounting sleeve having a cylindrical wall having an inner surface extending around a longitudinally extending passage; a lock receiving housing on said mounting sleeve, said lock receiving housing having a cylindrical wall segment secured to the wall of said sleeve, said sleeve having a passage formed in the wall thereof communicating with the chamber in said housing; and locking means in said chamber positionable through said passage formed in the wall of the sleeve for movement into one of said spaced detents in said outer tube.

11. A jack according to claim 10, said locking means comprising a cylindrical member; a pair of lugs extending outwardly from said cylindrical member; and actuating means secured to said cylindrical member adapted to rotate said cylindrical member for moving said lugs into said spaced detents.

12. A jack according to claim 11, said detents being equally spaced along a substantial portion of the length of said outer tube, said mounting sleeve having a passage longer than the spacing between adjacent detents such that at least two lugs on said locking means are simultaneously engageable with detents formed in said outer tube.

13. A top wind screw jack comprising: a hollow tubular jack body having a longitudinal axis, first and second ends, inner and outer wall surfaces, and a longitudinally extending bore, said inner and outer wall surfaces and said bore being concentric to said longitudinal axis of said jack body; threaded screw means extending through said bore, said screw means having a first end projecting beyond said first end of said hollow tubular jack body; threaded ram means in said bore, said threaded ram means engaging said threaded screw means; crank means; means movably securing said crank means to said first end of said threaded screw means such that said crank means is movable between:
  (a) an extended position wherein said crank means is movable to rotate said screw means to move said ram means and
  (b) a retracted position wherein said crank means frictionally engages said outer wall of said tubular jack body to prevent rotation of said threaded screw means.

14. A top wind screw jack according to claim 13, said ram means comprising: a hollow tubular member having an outer wall surface in which a longitudinally extending guide way is formed; internally threaded jack nut means; and means securing said internally threaded jack nut means to said tubular member such that rotation of said threaded screw means imparts movement to said tubular member longitudinally of said tubular jack body.

15. A top wind screw jack according to claim 14, said jack body comprising a tubular member having an outer wall surface and an inner wall surface, said inner wall surface extending around the periphery of said bore, said jack body being deformed to provide spaced projections on the inner wall surface of said tubular jack body and spaced recesses in the outer wall surface of said tubular jack body, said projections on said inner wall surface of said tubular jack body extending into said guide way formed in the outer wall surface of said tubular ram means to prevent rotation of said ram means relative to said jack body; mounting means having a longitudinally extending passage through which said jack body is telescopically received; and locking means on said mounting member, said locking means being movable to selectively engage at least one of said spaced recesses in said jack body to limit longitudinal movement of said jack body through said passage in said mounting member.

16. A top wind screw jack according to claim 15, said threaded screw means having an aperture formed therein, and said crank means having a shank extending through said aperture in said threaded screw means for rotating said screw means; a crank arm secured to said shank; and a handle secured to said crank arm, said crank arm being configured to permit rotation of said crank arm and handle about said shank between said extended and retracted positions.

17. A jack according to claim 1, with the addition of a support means; and a pin connector means to allow rotation of said support means about an axis.

18. A jack according to claim 17, said support means comprising; pin means having a longitudinal axis; a plate having a bracket formed by upwardly bent ears cut out of the plate; said ears having slotted openings to allow for rotation about the longitudinal axis of said pin; and a seat on which the ram of the jack rests formed by an extrusion in the plate, located between the ears of the bracket, which provides support to the ram through the full motion of the support.

* * * * *

UNITED STATES PATENT AND TRADEMARK OFFICE
CERTIFICATE OF CORRECTION

PATENT NO. : 5,174,550

DATED : December 29, 1992

INVENTOR(S) : Jerry W. Pittman

It is certified that error appears in the above-identified patent and that said Letters Patent is hereby corrected as shown below:

In Column 5, line 68, change "surfaces" to -- surface -- ;

In Column 6, line 31, change "A jack according to claim 3, said crank further comprising:" to -- A jack according to claim 4, said crank means further comprising: --;

In Column 8, line 21, change "mounting member" to -- mounting means -- ;

In Column 8, line 39, change "comprising;" to -- comprising: --.

Signed and Sealed this

Ninth Day of November, 1993

Attest:

BRUCE LEHMAN

Attesting Officer   Commissioner of Patents and Trademarks